United States Patent [19]

Akiyama

[11] Patent Number: 6,065,094
[45] Date of Patent: May 16, 2000

[54] INEXPENSIVE COMPRESSED DATA STORAGE APPARATUS WITH IMPROVED RESISTANCE TO VIBRATIONS

[75] Inventor: Jun Akiyama, Kashihara, Japan

[73] Assignee: Sharp Kabushiki Kaisha, Osaka, Japan

[21] Appl. No.: 08/900,173

[22] Filed: Jul. 25, 1997

[30] Foreign Application Priority Data

Aug. 2, 1996 [JP] Japan ................................ 8-204446
May 29, 1997 [JP] Japan ................................ 9-139587

[51] Int. Cl.$^7$ ........................................................ G06F 13/16
[52] U.S. Cl. ........................ 711/112; 710/52; 710/57; 710/60; 710/68; 711/111
[58] Field of Search .................... 711/112, 113, 711/111; 710/60, 68, 57, 52

[56] References Cited

U.S. PATENT DOCUMENTS 5,506,872  4/1996  Mohler ................................ 375/240

OTHER PUBLICATIONS

Japanese KOKAI (Published unexamined patent application) No. 103079/1992 (Tokukaihei 4–103079, Published Date: Apr. 6, 1992).

Primary Examiner—Reginald G. Bragdon
Attorney, Agent, or Firm—David G. Conlin; Richard E. Gamache

[57] ABSTRACT

A compressed data storage apparatus is provided with a compressing circuit for generating compressed data by compressing digital data from a camera section, a buffer memory for storing the compressed data temporarily, a disk device for storing the compressed data stored in the buffer memory at a rate faster than a rate at which the buffer memory stores the compressed data, and a system controller for increasing a compression ratio of the compressing circuit when detecting that the disk device has become unable to record the data. According to the above arrangement, in the event that the disk device becomes unable to store the data due to vibrations or an impact, the data compression ratio is increased, whereby the rate at which the buffer memory stores the data is reduced. Consequently, the capacity of the buffer memory can be reduced, and therefore, it has become possible to provide an inexpensive compressed data storage apparatus with excellent resistance to vibrations.

29 Claims, 7 Drawing Sheets

FIG. 2(a)
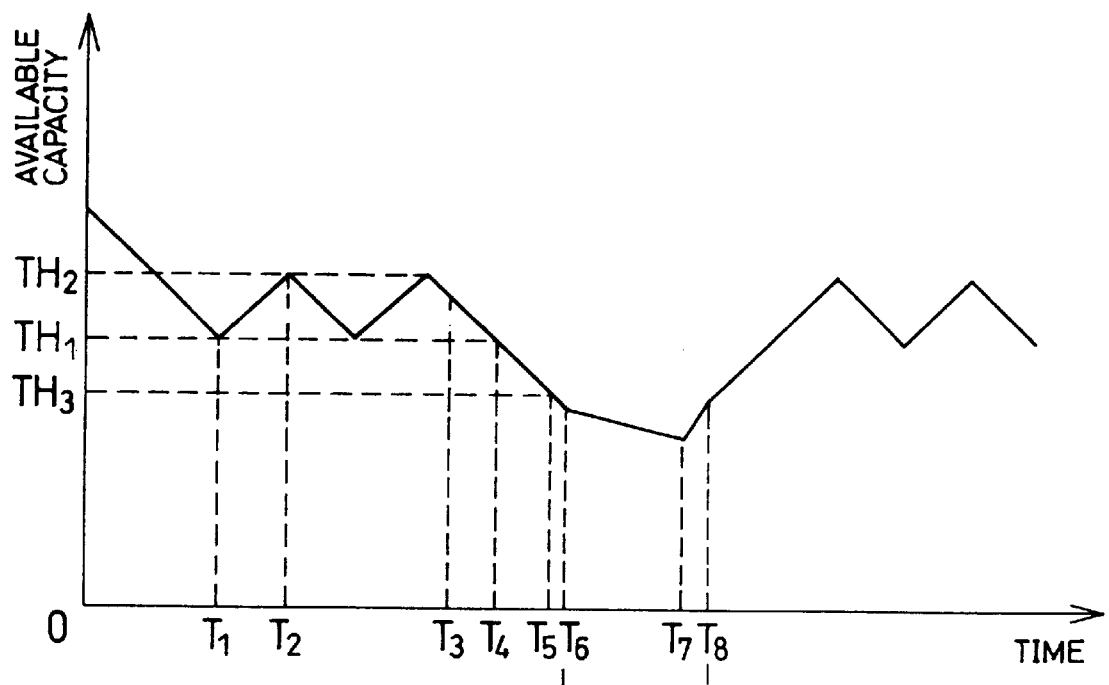
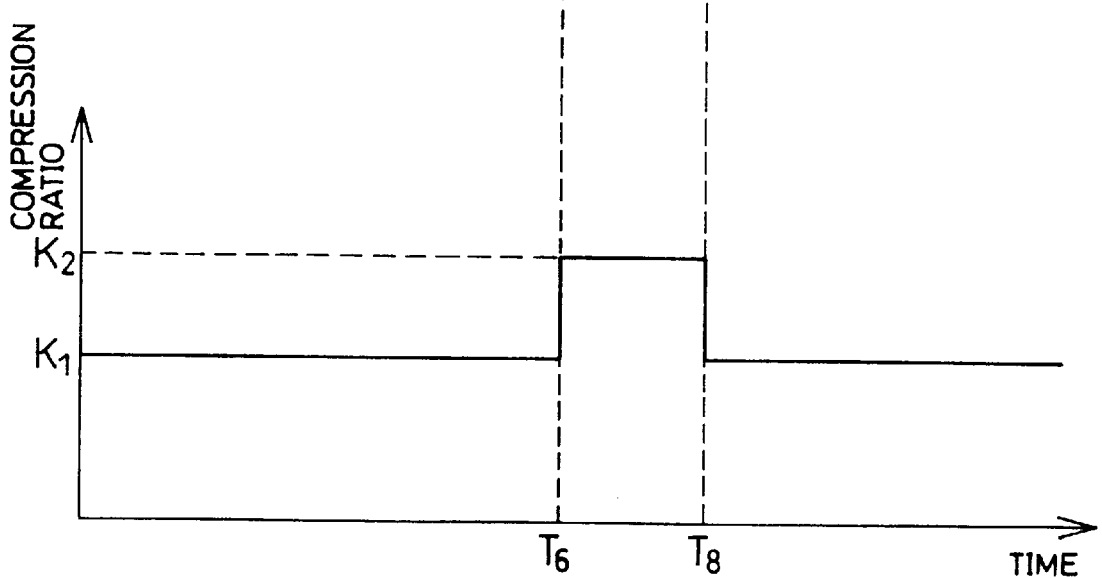
FIG. 2(b)

INEXPENSIVE COMPRESSED DATA STORAGE APPARATUS WITH IMPROVED RESISTANCE TO VIBRATIONS

FIELD OF THE INVENTION

The present invention relates to a data storage apparatus, and more particularly to an inexpensive compressed data storage apparatus with improved resistance to vibrations.

BACKGROUND OF THE INVENTION

The need for efficiently storing digital data has increased significantly with the increased digitization of various kinds of data such as image data and audio data. While data storage apparatuses keep increasing their capacity and density to keep pace with technical advances, various techniques have also been introduced for compressing data when processing digital signals.

For example, when an image including 640×480 pixels, each pixel having 8 bits for each RGB, is recorded or reproduced at 30 images per second, approximately 220 MB of data is generated per second. To store two hours worth of such data, a storage capacity of approximately 200 GB is necessary. This huge amount of data can be compressed and transferred at a transfer rate of 4–5 Mbps and stored in a device having several GB of storage capacity. However, once the data is compressed at a compression ratio of nearly $1/100$ as above, the original data is not restored completely when the compressed data is expanded. As a result, the compression processing deteriorates the image quality. Generally, the higher the compression ratio, the worse the image quality. To solve this problem, a technique has been proposed that allocates a greater amount of data to images involving many motions that readily cause quality deterioration and a smaller amount of data to images involving less motions. This technique can suppress the deterioration of the image quality by varying the amount of data allocated according to the image type; that is, by varying the compression ratio according to the image type.

Another problem caused by the data compression will now be explained. An "off-servo" error sometimes occurs when a portable disk device is subject to vibrations or an impact during use. Various countermeasures have been taken to solve this problem, such as providing an anti-vibration mechanism and improving servo characteristics. However, these countermeasures alone cannot prevent the off-servo error caused by a large impact or the like, thereby making the recording/reproduction impossible. To solve the above problem, Japanese Laid-open Patent Application No. 103079/1992 (Tokukaibei No. 4-103079) discloses an apparatus with improved vibration resistance that stores the compressed data into a buffer memory first, and then onto the disk. In the following, the arrangement and operation of the above conventional apparatus will be explained with reference to the accompanying drawings.

FIG. 7 is a block diagram depicting an arrangement of a conventional compressed data storage apparatus. When data is recorded into a disk device 104, an input signal is converted into a digital signal by an A/D converter 107 and sent to a compressing/expanding circuit 112. When the data is reproduced from the disk device 104, the digital signal is converted into an analog signal by a D/A converter 113 through the compressing/expanding circuit 112. The compressing/expanding circuit 112 is a circuit for compressing or expanding the data.

In the following, the compression processing related to the present invention will be explained. First, the data inputted into the compressing/expanding circuit 112 is compressed. Various compressing methods have been proposed, and when the subject data is image data or audio data, a human's visual or audio capabilities are exploited to attain a high compression ratio. Consequently, the input data is compressed at a compression ratio on the order of $1/10$. The data compressed by the compressing/expanding circuit 112 is then sent to a buffer memory 102 through a memory controller 103 and stored temporarily therein. The memory controller 103 is a circuit for controlling the flow of the data through the compressing/expanding circuit 112, buffer memory 102, and disk device 104. More specifically, the memory controller 103 manages the addresses of the data in the buffer memory 102 which are transferred from the compressing/expanding circuit 112, and the addresses of the data transferred to the disk device 104 from the buffer memory 102. Also, the memory controller 103 detects an available capacity of the buffer memory 102 based on these addresses. The disk device 104 is a device for storing the data; for example, an optical disk device and a hard disk device. Both of these examples control an optical pick-up or a magnetic head to determine its position precisely to within about a micron. Therefore, if considerable vibrations or impact is given onto the device, the optical pick-up or magnetic head is displaced from the original position, thereby making the recording/reproduction impossible.

Next, the operation of the conventional compression data storage apparatus will be explained. The change of the available capacity of the buffer memory 102 over time is illustrated in FIG. 8. The available capacity of the buffer memory 102 referred herein means the amount of the memory capacity that remains unused, and is in effect, the difference between the full capacity of the buffer memory 102 and the amount of data remaining in the buffer memory 102 and not transferred to the disk device 104. Thus, when the data is transferred to the buffer memory 102 from the compressing/expanding circuit 112, the available capacity of the buffer memory 102 decreases, and when the data is transferred to the disk device 104 from the buffer memory 102, the available capacity of the buffer memory 102 increases. In FIG. 8, assume that the compressing/expanding circuit 112 starts to compress the data at a time 0. Therefore, the buffer memory 102 is empty at the time 0; in other words, a full capacity of the buffer memory 102 is available. Since the data compressed by the compressing/expanding circuit 112 is transferred to the buffer memory 102 at a constant transfer rate, the available capacity of the buffer memory 102 keeps decreasing over time. In the meantime, the available capacity of the buffer memory 102 drops below a first predetermined value TH1 at a time T1, and a system controller 105 is so notified by the memory controller 103. Upon receipt of the notification, the system controller 105 issues two commands: one is a command to the memory controller 103 to start the data transfer from the buffer memory 102 to the disk device 104, and the other is a command to the disk device 104 to start writing data onto the disk. Because the data transfer rate from the buffer memory 102 to the disk device 104 is set higher than the data transfer rate from the compressing/expanding circuit 112 to the buffer memory 102, the amount of the compressed data stored temporarily in the buffer memory 102 starts to decrease over time, and hence the available capacity of the buffer memory 102 starts to increase. In the meantime, the available capacity of the buffer memory 102 exceeds a second predetermined value TH2 at a time T2, and the system controller 105 is so notified by the memory controller 103. Upon receipt of the notification, the system controller 105 issues two commands: one is a command to the memory controller 103 to stop the data transfer from the buffer memory 102 to the disk device 104, and the other is a command to the disk device 104 to stop writing data onto the disk. In normal operation, the cycle of writing data onto the disk device 104 when the available capacity of the buffer memory 102 drops below TH1 and not writing data onto the disk when the available capacity of the buffer memory 102 exceeds TH2 is repeated hereinafter. Assume that an impact is given onto the disk device 104 at a time T3, and the disk device 104 becomes unable to write data and takes a time T5 to be restored to the data writable state. Then, the available capacity of the buffer memory 102 starts to decrease over time and drops below the first predetermined value TH1 at a time T4, at which the disk device 104 has not yet been restored to the data writable state. Thus, the system controller 105 does not start the data transfer from the buffer memory 102 to the disk device 104, and the available capacity of the buffer memory 102 keeps decreasing. In the meantime, the system controller 105 detects that the disk device 104 has been restored to the data writable state at T5, and issues a command to the memory controller 103 to start the data transfer from the buffer memory 102 to the disk device 104, whereupon available capacity of the buffer memory 102 starts to increase. Hereinafter, the normal operation is carried out repetitively.

As explained above, the conventional compressed data storage apparatus stores the data into the buffer memory 102 temporarily. According to this arrangement, in the event that the disk device 104 becomes unable to write the data temporarily, the compressed data storage apparatus can write the data onto the disk device 104 correctly without missing any data only if the disk device 104 is restored to the data writable state before the buffer memory 102 stores the data to its full capacity (available capacity=0). Consequently, this arrangement can improve the vibration resistance of the compressed data storage apparatus.

To realize the above operation, an apparatus only has to satisfy two conditions as follows:

(1) the apparatus includes a buffer memory; and
(2) a data transfer rate from the buffer memory to the disk device is higher than a data transfer rate from the input end to the buffer memory.

Note that the apparatus can readily satisfy these conditions only by including a compressing circuit somewhere in a path between the input end and buffer memory, because this can decrease the data transfer rate from the input end to the buffer memory. In case of the aforementioned motion image data, the data transfer rate can be reduced from 220 Mbps to 4 Mbps. Therefore, the data transfer rate to the disk device should be at least 220 Mbps without the compression, but providing the compressing circuit somewhere in the above path can ease the data transfer rate condition to approximately 4 Mbps.

As explained above, the prior art readily realizes an excellent vibration-resistant apparatus by combining the buffer memory and the compressing circuit.

However, when the conventional apparatus is used for data with a high data transfer rate, the capacity of the buffer memory has to be increased. For example, in case of the motion image data, if the disk device takes 5 seconds to return from the damage caused by an impact, a buffer memory of as large as 4 Mbps×5 s=20 Mb is necessary. Therefore, when data with a high data transfer rate is handled, the capacity of the buffer memory increases and so does the cost of the apparatus.

SUMMARY OF THE INVENTION

It is therefore an object of the present invention to provide an inexpensive compressed data storage apparatus with excellent resistance to vibrations.

To fulfill the above object, the compressed data storage apparatus of the present invention is characterized by being furnished with:

a compressing circuit for generating compressed data by compressing the data;

a temporary storage circuit for temporarily storing the compressed data;

a storage device for storing the compressed data by retrieving the compressed data from the temporary storage circuit at a rate faster than a rate at which the compressing circuit outputs the compressed data to the temporary storage circuit; and a control circuit for controlling an output rate at which the compressing circuit outputs the compressed data when detecting that the storage device has become unable to store the compressed data, the output rate being controlled to be larger than O and smaller than a normal value.

According to the above arrangement, when the control circuit detects that the storage circuit has become unable to store the compressed data, the control circuit reduces the output rate at which the compressing circuit outputs the compressed data below the normal value by, for example, increasing the compression ratio of the compressing circuit or limiting the kind(s) of data to be compressed when the compressing circuit compresses more than one kind of data. Accordingly, the temporary storage circuit takes a longer time to store the data to its full capacity (no unused memory capacity) compared with a case using a fixed output rate. Also, since the output rate is set larger than zero during this period, the quality of the compressed data may possibly deteriorate, but the compressed data storage apparatus can store the data continuously.

Incidentally, when the storage device becomes unable to store the compressed data due to an impact or the like, the unused memory capacity of the temporary storage circuit keeps decreasing. When the memory capacity of the temporary storage circuit is used to its full capacity, the temporary storage circuit can no longer store the compressed data sent from the compressing circuit unless the storage device is restored to the data writable state. Consequently, the compressed data storage circuit cannot store the data compressed during the above specified period.

However, according to the above arrangement, a time required for the temporary storage circuit to store the compressed data to its full capacity can be extended even if the temporary storage circuit has a capacity as large as the capacity of its conventional counterpart. Consequently, it has become possible to provide an inexpensive compressed data storage apparatus with excellent resistance to vibrations.

Particularly, because the pick-up of the optical disk is heavy, it takes a long time to be restored to the data writable state. Thus, when the optical disk is used as the storage device of the compressed data storage apparatus, the effect of the present invention is significant.

In case that the kind(s) of data compressed by the compressing circuit is (are) limited than the normal case to reduce the output rate of the compressing circuit, it is preferable that the compressed data storage apparatus is further furnished with an appended data generating circuit for compensating the data which is not compressed. When the compressed data generated out of the limited kind(s) of data are stored into the storage device, the appended data generating circuit compensates the other data of the non-limited kind(s) by, for example, appending the data immediately before the limitation, or predetermined data.

Consequently, compared with a case where no data related to the other data of the non-limited kind(s) are appended, the compressed data storage apparatus can store the data which can be reproduced more naturally.

Timing at which the control circuit reduces the output rate of the compressing circuit can be determined by various methods regardless of the methods of reducing the output rate of the compressing circuit. For example, when the priority is placed on the memory capacity reduction of the temporary storage circuit, it is preferable that the control circuit reduces the output rate whenever detecting that the storage device has become unable to store the compressed data. According to this arrangement, when the storage device becomes unable to store the compressed data, the control circuit can start to reduce the output rate at an earlier stage. Consequently, a time required for the temporary storage circuit to store the compressed data to its full capacity can be extended further.

On the other hand, when the priority is placed on the quality of the compressed data stored into the storage device, it is preferable that the control circuit reduces the output rate of the compressing circuit when the unused memory capacity of the temporary storage circuit is smaller than a predetermined value and the control circuit detects that the storage device has become unable to store the compressed data. According to this arrangement, even if the storage device has become unable to store the compressed data, the control circuit does not reduce the output rate of the compressing circuit while the unused memory capacity of the temporary storage circuit is larger than the first predetermined value. Thus, compared with a case where the output rate is reduced whenever the control circuit detects the storage device has become unable to store the compressed data, the output rate can be reduced at a later timing. Consequently, if the storage device has been restored to the data writable state before the above timing comes, the control circuit does not have to reduce the output rate of the compressing circuit, thereby making it possible to maintain the quality of the compressed data. Note that if the unused memory capacity of the temporary storage circuit drops below the first predetermined value, the output rate of the compressing circuit is reduced, thereby securing some time until the temporary storage circuit stores the compressed data to its full capacity.

In addition, it is preferable that the control circuit increases the output rate of the compressing circuit to the original value when the storage device has been restored to the data writable state in manner opposite to reducing the output rate. Consequently, when the storage circuit has been restored to the data writable state, the quality of the compressed data stored in the storage device can be increased to the normal level.

Also, timing at which the control circuit increase the output rate of the compressing circuit to the normal value can be determined by various methods depending on the intended use of the compressed data storage device. For example, when the priority is placed on the quality of the compressed data stored in the storage device in the compressed data storage apparatus, it is preferable that the control circuit increases the output rate to the normal value whenever detecting that the storage circuit has been restored to the data writable state. On the other hand, when the priority is placed on the memory capacity reduction of the temporary storage circuit and improvement of the resistance to vibrations, it is preferable that the control circuit increases the output rate to the normal value with reference to the unused memory capacity of the temporary storage circuit.

Incidentally, in each of the above arrangements, it is preferable to further provide a circuit for notifying the user that the output rate of the compressing circuit is reduced by displaying the compressing ratio, for example. According to this arrangement, the user can acknowledge the reduction of the output rate, so that he can take an appropriate action, such as supporting the compressed data storage apparatus firmly.

For a fuller understanding of the nature and advantages of the invention, reference should be made to the ensuing detailed description taken in conjunction with the accompanying drawings.

BRIEF DESCRIPTION OF THE DRAWINGS

FIG. 2 shows a graph representing a change of an available capacity of a buffer memory over time and a graph representing a change of a compression ratio over time in the compressed data storage apparatus of Embodiment 1 in one case;

DESCRIPTION OF THE EMBODIMENTS

Referring to the accompanying drawings, the following description will describe example embodiments of the present invention.

Embodiment 1

Figure 1:
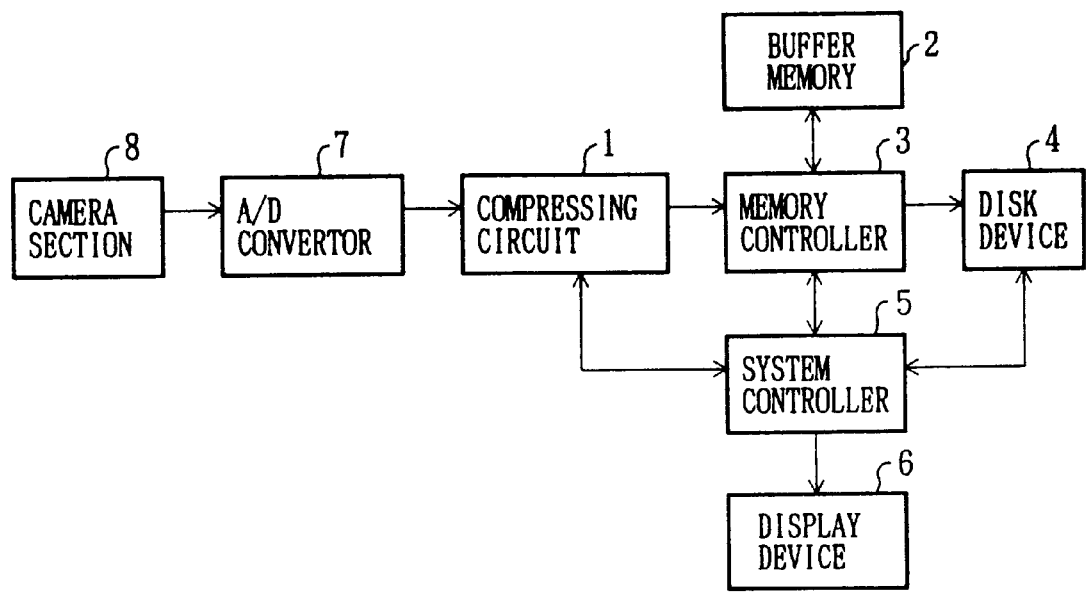
FIG. 1 is a block diagram depicting an arrangement of a compressed data storage apparatus in accordance with Embodiment 1 of the present invention.

FIG. 1 is a block diagram depicting a compressed data storage apparatus in accordance with Embodiment 1 of the present invention. As an illustrative example of this embodiment, the present invention is applied to a camcorder. Image information is first converted into an electric signal by a camera section 8, and then converted into a digital signal by an A/D converter 7 and sent to the compressing circuit 1. Next, the data inputted into the compressing circuit 1 is compressed. There has been proposed various compressing methods, and when the subject data is image data, a human's visual capabilities can be exploited to attain a high compression ratio. Consequently, the input data is compressed at a compression ratio on the order of $\frac{1}{10}$. Note that the compressing circuit 1 of Embodiment 1 can change a data compression ratio by command from a system controller 5, and for this reason, data indicating the applied compression ratio is appended to the compressed data. The data compressed by the compressing circuit 1 is then sent to a buffer memory 2 through a memory controller 3 and stored temporarily therein. The memory controller 3 is a circuit for controlling the flow of data through the compressing circuit 1, buffer memory 2, and disk device 4. More specifically, the memory controller 3 manages the addresses of the data in the buffer memory 2 transferred from the compressing circuit 1, and the addresses of the data transferred to the disk device 4 from the buffer memory 2. Also, the memory controller 3 detects available capacity of the buffer memory 2 based on these addresses. The disk device 4 is a device for storing the data, and an optical disk device is used herein. The optical disk has a fast access rate and the largest capacity among all the disk-swapping type storage apparatuses. Therefore, the optical disk is most suitable to handle data like image data, which demands a large capacity memory. However, the optical disk device controls an optical pick-up to determine its position precisely on the order of micron. Therefore, if the device is subject to a considerable vibration or impact, the optical pick-up is displaced from its original position, thereby making recording impossible. In particular, because the optical pick-up of the optical disk device is heavier than a magnetic head of the hard disk device, vibration or impact can have a more serious effect. For example, once the pick-up is displaced, it takes a long time to return to the original position.

The operation of the apparatus of Embodiment 1 will now be explained. Graph (a) of FIG. 2 represents the change of the available capacity of the buffer memory 2 over time. The available capacity of the buffer memory 2 referred herein means the amount of memory capacity that remains unused and is, in effect, the difference between the full capacity of the buffer memory 2 and the amount of data remaining in the buffer memory 2 that is not transferred to the disk device 4. Thus, when the data is transferred to the buffer memory 2 from the compressing circuit 1, the available capacity of the buffer memory 2 decreases, and when the data is transferred to the disk device 4 from the buffer memory 2, the available capacity of the buffer memory 2 increases. Graph (b) of FIG. 2 represents the change of the compression ratio of the compressing circuit 1 over time. The higher the compression ratio, the less the amount of data is output from the compressing circuit 1, and hence, the higher the compression ratio, the lower the data transfer rate of the output data. In Graph (a) of FIG. 2, assume that the recording starts at a time 0 and the compressing circuit 1 starts to compress the data concurrently with the recording. Therefore, the buffer memory 2 is empty at the time 0, and the full capacity of the buffer memory 2 is available. Because the data compressed by the compressing circuit 1 is transferred to the buffer memory 2 at a constant transfer rate, the available capacity of the buffer memory 2 keeps decreasing over time. In the meantime, the available amount of buffer memory 2 drops below a first predetermined value TH1 at a time T1, and the system controller 5 is so notified by the memory controller 3. Upon receipt of the notification, the system controller 5 issues two commands: one is a command to the memory controller 3 to start the data transfer from the buffer memory 2 to the disk device 4, and the other is a command to the disk device 4 to start writing data to the disk. Because the data transfer rate from the buffer memory 2 to the disk device 4 is set higher than the data transfer rate from the compressing circuit 1 to the buffer memory 2, the amount of the compressed data stored temporarily in the buffer memory 2 starts to decrease over time, and hence, the available capacity of the buffer memory 2 starts to increase. In the meantime, the available capacity of the buffer memory 2 exceeds a second predetermined value TH2 at a time T2, the system controller 5 is so notified by the memory controller 3. Upon receipt of the notification, and the system controller 5 issues two commands: one is a command to the memory controller 3 to stop the data transfer from the buffer memory 2 to the disk device 4, and the other is a command to the disk device 4 to stop writing data onto the disk. In normal operation, the cycle of writing data onto the disk when the available capacity of the buffer memory 2 drops below TH1 and not writing data onto the disk when the available capacity of the buffer memory 2 exceeds TH2 is repeated. Also, the compression ratio is maintained at a predetermined regulation value K1 during normal operation.

Assume that an impact is applied to the disk device 4 at a time T3, and the disk device 4 becomes unable to write data and takes a time T7 to be restored to the data writable state. Then, the available capacity of the buffer memory 2 starts to decrease over time and drops below the first predetermined value TH1 at a time T4, at which the disk device 4 has not yet been restored to the data writable state. Thus, the system controller 5 does not start the data transfer from the buffer memory 2 to the disk device 4, and the available capacity of the buffer memory 2 keeps decreasing. In the meantime, the available capacity of the buffer memory 2 drops below a third predetermined value TH3 at a time T5, and the system controller 5 is so notified by the memory controller 3. Upon receipt of the notification, the system controller 5 issues a command to the compressing circuit 1 to increase the compression ratio to K2. Upon receipt of the command, the compressing circuit 1 increases the data compression ratio to K2 to reduce the amount of data transferred to the buffer memory 2. Generally, the image data is compressed per data block, each data block having a certain amount of the data, and the compression ratio cannot be changed while a data block is being processed. Therefore, the compressing circuit 1 increases the compression ratio at a time T6, at which the compressing circuit 1 starts the processing of a new data block following a data block that was being processed when the command from the system controller 5 arrived. Then, the system controller 5 detects that the compression ratio of the compressing circuit 1 is increased to K2 at the time T6 and so indicates on a display device 6. More specifically, since the camcorder has a liquid crystal monitor screen, the screen shows a display indicating that the compression ratio is increased. Alternatively, an LED may be used as a display element and turned on when the compression ratio is increased. This display enables the user to take an appropriate action. More specifically, as previously mentioned, it is known that the image quality deteriorates as the compression ratio increases. Therefore, if the user learns that the compression ratio is increased, he can maintain the image quality by manipulating the camcorder to avoid the recording of fast moving images. Also, because considerable vibration or impact applied to the camcorder causes an increase of the compression ratio, the above display can call the attention of the user to support the camcorder more carefully to prevent vibrations or an impact, so that the disk device 4 can be restored to the data writable state faster. Alternatively, instructions as above may be displayed on the liquid crystal monitor screen, so that the user can take an appropriate action by manipulating the camcorder according to the instructions on the monitor screen. Because the compression ratio starts to increase at the time T6, the data transfer rate from the compressing circuit 1 to the buffer memory 2 drops, whereby a decreasing rate of the available capacity of the buffer memory 2 starts to drop from the time T6 as is indicated by a mild slope in Graph (a) of FIG. 2.

In the meantime, the controller 5 detects that the disk device 4 has been restored to the data writable state at a time T7, and issues a command to the memory controller 3 to start the data transfer from the buffer memory 2 to the disk device 4, whereupon the available capacity of the buffer memory 2 starts to increase. At the same time, the system controller 5 issues a command to the compressing circuit 1 to reduce the compression ratio to the initial K1. As in the case of increasing the compression ratio, the compressing circuit 1 reduces the compression ratio to K1 at a time T8, at which the compressing circuit 1 starts the processing of a new data block following a data block which was being processed when the command from the system controller 5 arrived. In the meantime, the system controller 5 detects that the compression ratio is reduced to K1 and so indicates on the display device 6. Hereinafter, the normal operation is carried out repetitively.

In Embodiment 1, the compression ratio is reduced to the initial K1 after the system controller 5 detects that the disk device 4 has been restored to the data writable state. This arrangement can start to reduce the compression ratio at an early stage, thereby preventing the deterioration of the image quality at an early stage.

Figure 3A:
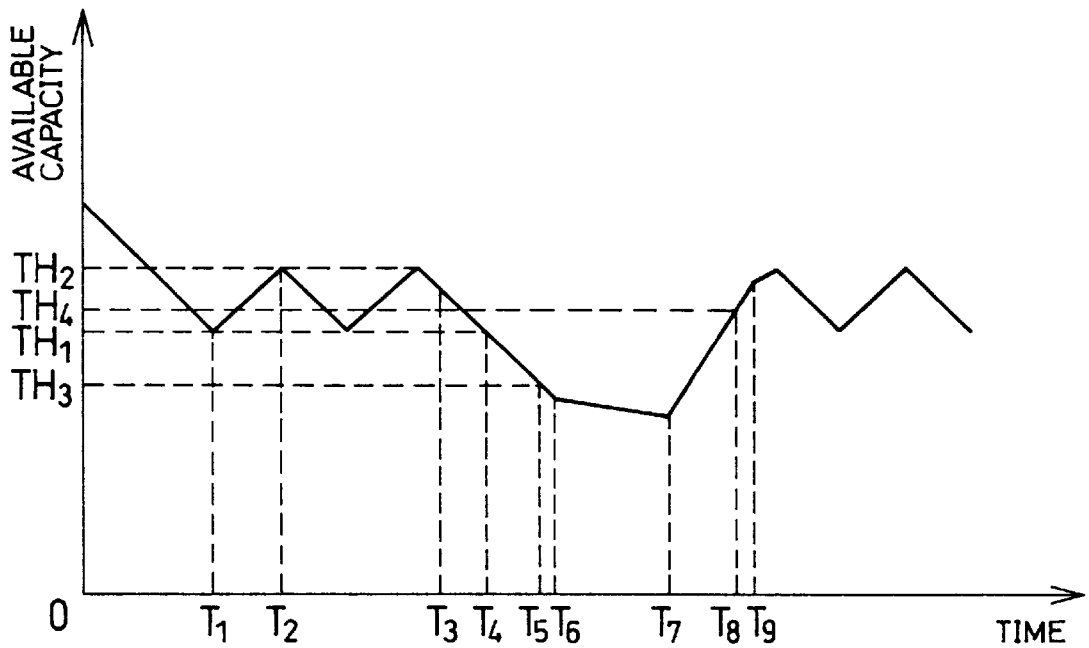
FIG. 3 shows a graph representing a change of an available capacity of a buffer memory over time and a graph representing a change of a compression ratio over time in the compressed data storage apparatus of Embodiment 1 in another case.
Figure 3B:
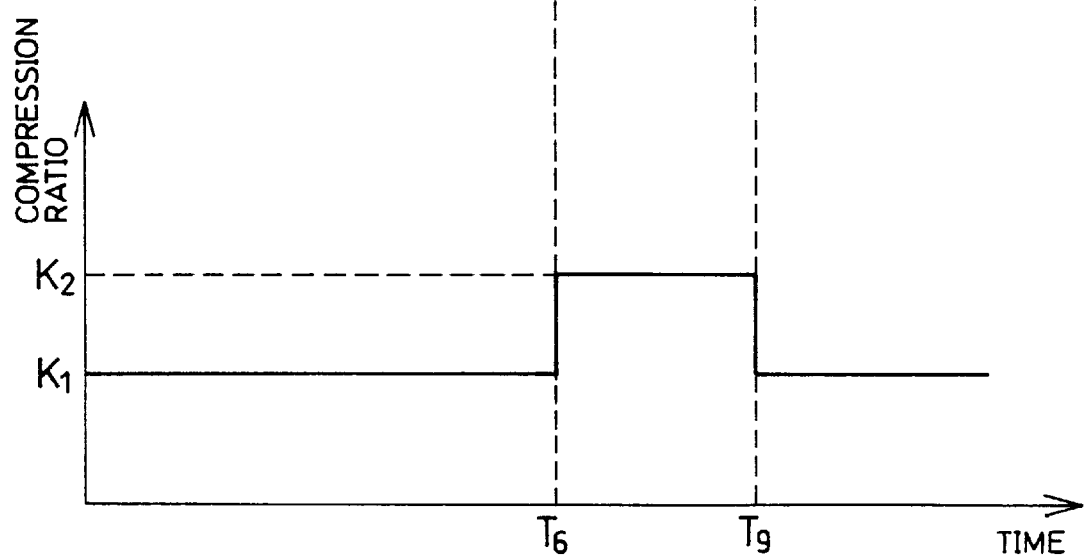

The following will describe another operation of the apparatus when the compression ratio is reduced to the initial K1 when the available capacity of the buffer memory 2 exceeds a predetermined value. The change in the available capacity of the buffer memory 2 and the change in the compression ratio over time are illustrated by Graphs (a) and (b) of FIG. 3, respectively. Because the changes up to the time T7 are identical in Graphs (a) and (b) of FIG. 2, the changes after the time T7 will be described. At the time T7, the system controller 5 detects that the disk device 4 has been restored to the data writable state, and issues a command to the memory controller 3 to start the data transfer from the buffer memory 2 to the disk device 4, whereupon the available capacity of the buffer memory 2 starts to increase. When the available capacity of the buffer memory 2 reaches TH4 at a time T8, the system controller 5 issues a command to the compressing circuit 1 to reduce the compression ratio to the initial K1. Accordingly, the compressing circuit 1 reduces the compression ratio to K1 at a time T9, at which the compressing circuit 1 starts the processing of a new data block following a data block which was being processed when the command arrived. Then, after the system controller 5 detects that the compression ratio is reduced to the initial K1, the system controller 5 so indicates on the display device 6. Hereinafter, the normal operation is carried out repetitively.

Because the compression ratio is reduced to the initial value after the available capacity of the buffer memory 2 has increased to TH4 as described above, the compression ratio is reduced after the buffer memory 2 has gained a sufficient available capacity. Therefore, in the event that the disk device 4 becomes unable to record the data due to a series of impacts, a time margin can be secured until the buffer memory 2 stores the data to its full capacity (available capacity=0). Note that TH4 must be larger than TH3, and is preferably larger than TH1.

Figure 4:
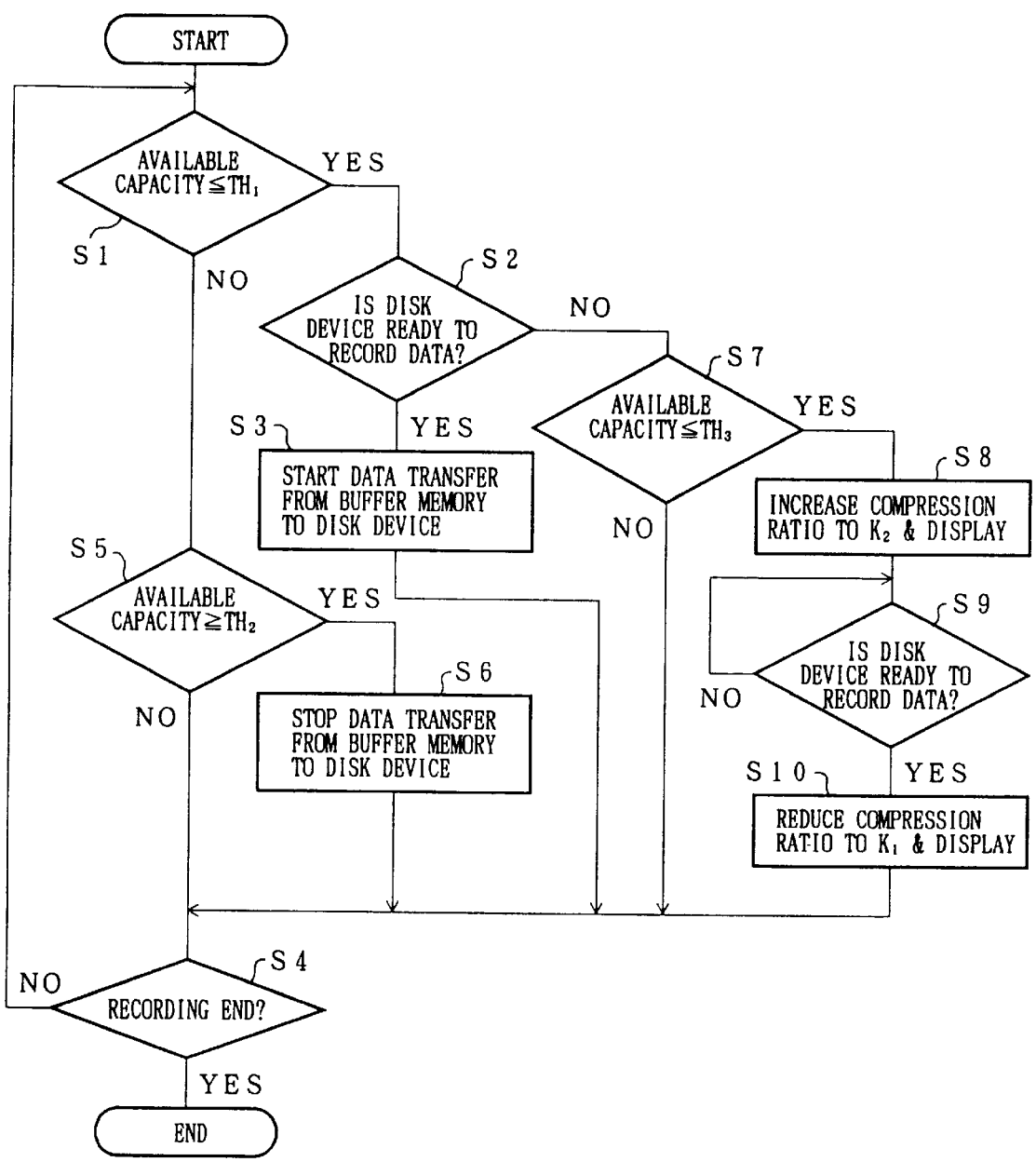
FIG. 4 is a flowchart detailing an operation of the compressed data storage apparatus of Embodiment 1.

The operation of the compressed data storage apparatus for the case shown in FIG. 2 will now be explained with reference to the flowchart of FIG. 4. When the recording of the image data starts, the compressed data storage apparatus compares the current available capacity of the buffer memory 2 with TH1 (S1). When the former is smaller than the latter, the compressed data storage apparatus checks whether or not the disk device 4 is ready to record the data (S2). If the disk device 4 is ready, the compressed data storage apparatus starts the data transfer from the buffer 2 to the disk device 4 (S3). After a while, the compressed data storage device checks whether or not the image data recording ends (S4), and if the image data recording should be continued, the compressed data storage apparatus returns to S1 and repeats the above operation. Because the data transfer rate from the buffer memory 2 to the disk device 4 is set higher than the data transfer rate from the input end to the buffer memory 2, the available capacity of the buffer memory 2 keeps increasing to exceed TH1 while a loop of S1–S4 is being carried out, whereupon the compressed data storage apparatus proceeds to. S5 to compare the current available capacity with TH2. If the available capacity has increased above TH2 along with the recording action of the disk device 4, the compressed data storage apparatus stops the data transfer from the buffer memory 2 to the disk device 4 (S6). A normal recording operation is carried out in the above manner.

The following will describe the flow when the disk device 4 becomes unable to record the data. The disk device 4 is judged to have become unable to record data when the available capacity drops below TH1. In this case, the compressed data storage apparatus proceeds to S7 from S2 to compare the current available capacity with TH3. When the former is smaller than the latter, the compressed data storage apparatus increases the compression ratio to K2 and so indicates on the screen (S8). Then, the compressed data storage apparatus waits under these conditions until the disk device 4 is restored to the data writable state (S9). In the meantime, the compressed data storage apparatus detects that the disk device 4 has been restored to the data writable state, whereupon the compressed data storage apparatus reduces the compression ratio to the initial K and so indicates on the screen.

In a period between T6 and T8 of Graph (a) of FIG. 2, the decreasing rate of the available capacity of the buffer memory 2 is reduced as the compression ratio has increased. Given that the buffer memory 2 has a capacity as large as its conventional counterpart, the above specified period of Graph (a) of FIG. 2 reveals that it takes longer for the buffer memory 2 to store the data to its full capacity (available capacity=0), thereby securing a time margin until the disk device 4 is restored to the data writable state. Alternatively, if the buffer memory 2 and its conventional counterpart take the same time to store the data to their full capacities, then the amount of an adopted memory can be reduced.

For further understanding, a more detailed explanation will now be given. For example, assume that a 16 Mb memory is used as the buffer memory 2, and the data are transferred to the same at a transfer rate of 4 Mbps for the first 3 seconds, after which the data transfer rate is reduced to 1.4 Mbps. Then, a time necessary for the buffer memory 2 to store the data to its full capacity (available capacity=0) is computed as:

$$3\ s+(16\ \text{Mb}-4\ \text{Mbps}\times 3\ s)/1.4\ \text{Mbps}=5.86\ s.$$

Because it takes 5.86 seconds for the buffer memory 2 to store the data to its full capacity (available capacity=0), a maximum time margin of 5.86 seconds is secured until the disk device 4 is restored to the data writable state. If the apparatus has a fixed transfer rate of 4 Mbps like the conventional apparatus, the time margin is 16 Mb/4 Mbps=4 s. Thus, the apparatus of Embodiment 1 of the present invention can extend the time margin by a factor of 1.5. Conversely, a capacity of the buffer memory necessary to secure a time margin of 5.86 seconds in the conventional apparatus is computed as:

$$4\ \text{Mbps}\times 5.86\ s=23\ \text{Mb}.$$

In contrast, the apparatus of Embodiment 1 can secure the same time margin with the buffer memory 2 of 16 Mb, thereby reducing the amount of memory by approximately 30%.

As explained above, the apparatus of Embodiment 1 of the present invention can reduce the capacity of the buffer memory significantly, or increase the time margin for being restored to the data writable state. In addition, the apparatus displays an indication on the screen that the compression ratio has been increased. Thus, the user can decide on the best way to suppress the deterioration of the image quality or to speed up the return to the data writable state.

In Embodiment 1, the compression ratio is changed between two levels. However, the compression ratio can be changed among more than two levels. Although this means that the compression rate is changed in a more complex manner, it has an advantage in that the deterioration of the image quality becomes less noticeable because the image quality deteriorates gradually. In addition, in Embodiment 1, the compression ratio is increased to a fixed value regardless of the available capacity of the buffer memory 2, but the compression ratio may vary with the available capacity of the buffer memory 2. In Embodiment 1, the compression ratio is increased when the available capacity of the buffer memory 2 drops below TH3. However, the compression ratio may be increased at the time T3 at which the disk device 4 has become unable to record the data, and reduced to the initial K1 at the time T7 at which the disk device 4 has been restored to the data writable state. Compared with the case in Embodiment 1, because the compression ratio is increased earlier, the image quality starts to deteriorate earlier as well in this case, but there is an advantage in that the capacity of the buffer memory can be further reduced.

Embodiment 2

Figure 5:
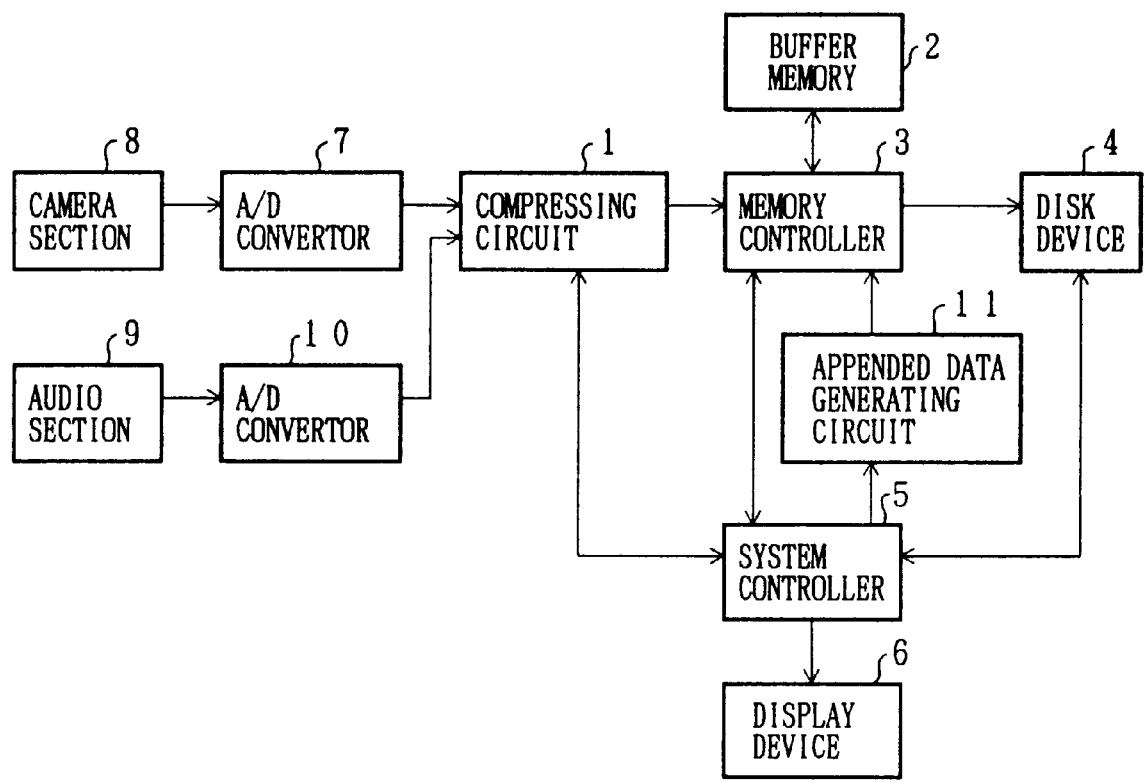
FIG. 5 is a block diagram depicting an arrangement of a compressed data storage apparatus in accordance with Embodiment 2 of the present invention.

The following description will describe Embodiment 2 of the present invention. FIG. 5 is a block diagram depicting an arrangement of a compressed data storage apparatus in accordance with Embodiment 2 of the present invention. Like Embodiment 1, the present invention is also applied to a camcorder as an example. Image information is first converted into an electric signal by a camera section 8, and then converted into a digital signal by an A/D converter 7 and sent to a compressing circuit 1. Similarly, audio information is first converted into an electric signal by an audio section 9, and then converted into a digital signal by an A/D converter 10 and sent to the compressing circuit 1. Then, the data inputted into the compressing circuit 1 is compressed. The compressing circuit receives both the image data and audio data, and applies a compressing method suited for each kind of data separately. Also, the compressing circuit 1 compresses both kinds of data concurrently in parallel, and the compressed image data and audio data are combined into one data series. During this process, an identification code is appended to each of the image data and audio data to identity whether the data in question is the image data or audio data. Because the image data and audio data are processed in parallel, the compressing circuit 1 can compress either of the image data or audio data alone by a selection command issued by a system controller 5. The data compressed by the compressing circuit 1 is sent to the buffer memory 2 through a memory controller 3 and stored temporarily therein The memory controller 3 is a circuit that controls the flow of the data through the compressing circuit 1, the buffer memory 2, and a disk device 4. More specifically, the memory controller 3 manages the addresses of the data in the buffer memory 2 transferred from the compressing circuit 1, and the addresses of the data transferred to the disk device 4 from the buffer memory 2. Also, the memory controller 3 detects an available capacity of the buffer memory 2 based on these addresses. The disk device 4 is a device for storing the data, and an optical disk device is used herein. An appended data generating circuit 11 is a circuit for appending a certain kind of image data when the audio data alone is compressed, that is, when the compressing circuit 1 does not output the compressed image data.

Figure 6A:
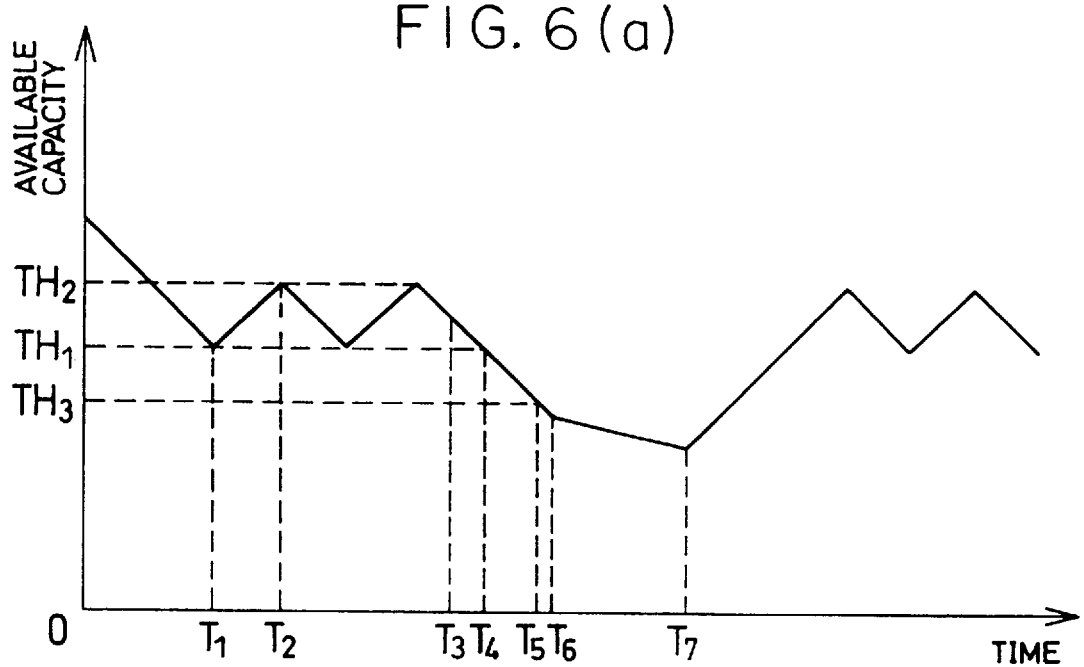
FIG. 6 shows a graph representing a change of an available capacity of a buffer memory over time and graphs each representing a change of a compression state over time in the compressed data storage apparatus of Embodiment 2.
Figure 6B:
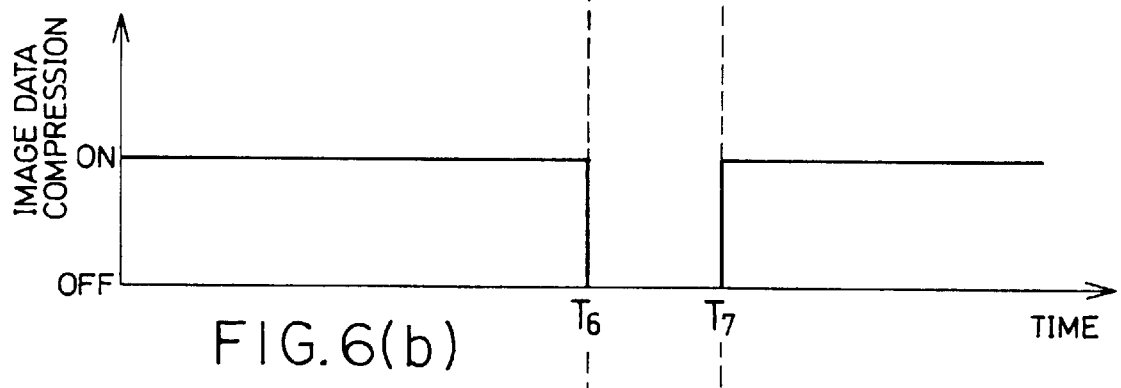
Figure 6C:
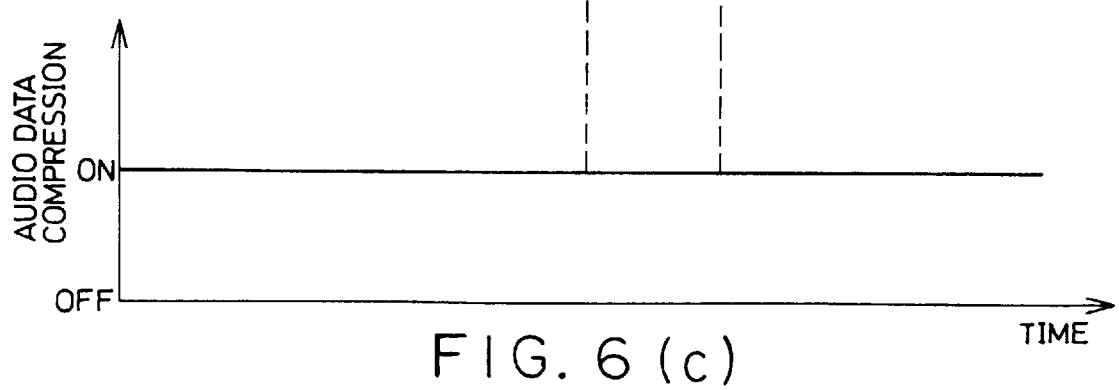
Figure 7:
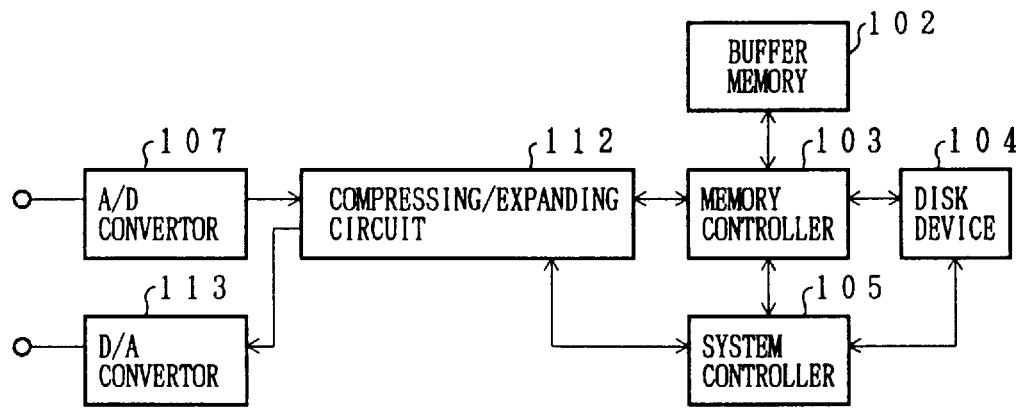
FIG. 7 is a block diagram depicting an arrangement of a conventional compressed data storage apparatus.
Figure 8:
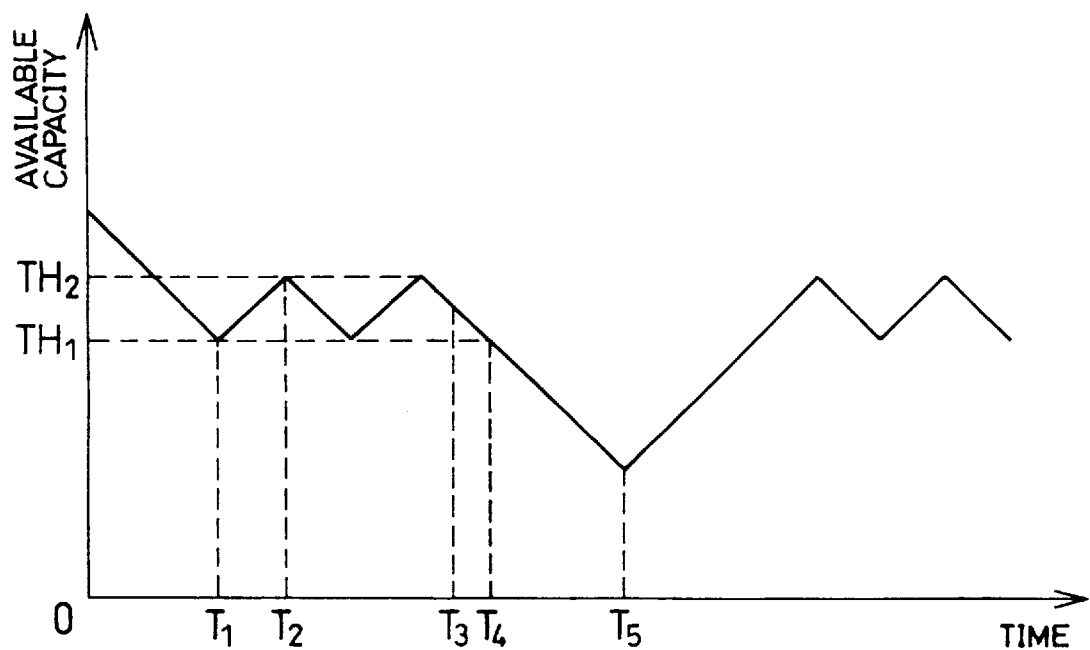
FIG. 8 shows a graph representing a change of an available capacity of a buffer memory over time in the conventional compressed data storage apparatus

Next, an operation of the apparatus of Embodiment 2 will be explained. Graph (a) of FIG. 6 represents the change of the available capacity of the buffer memory 2 over time. Graph (b) of FIG. 6 represents an image data compression state and ON means that the image data is being compressed and OFF means that the image data is not compressed. Similarly, Graph (c) of FIG. 6 represents an audio data compression state. Assume that the recording starts at a time 0 in Graph (a) of FIG. 6, and the compressing circuit 1 starts to compress the data concurrently with the recording. Thus, the buffer memory 2 is empty at the time 0, and a full capacity of the buffer memory 2 is available. Because the data compressed by the compressing circuit 1 is transferred to the buffer memory 2 at a constant transfer rate, the available capacity of the buffer memory 2 keeps decreasing over time. In the meantime, the available amount of the buffer memory 2 drops below a first predetermined value TH1 at a time T1, and the system controller 5 is so notified by the memory controller 3. Upon receipt of the notification, the system controller 5 issues two commands: one is a command to the memory controller 3 to start the data transfer from the buffer memory 2 to the disk device 4, and the other is a command to the disk device 4 to start writing the data onto the disk. Because the data transfer rate from the buffer memory 2 to the disk device 4 is set higher than the data transfer rate from the compressing circuit 1 to the buffer memory 2, the amount of the compressed data stored temporarily in the buffer memory 2 starts to decrease over time, and hence, the available capacity of the buffer memory 2 starts to increase. In the meantime, the available capacity of the buffer memory 2 exceeds a second predetermined value TH2 at a time T2, and the system controller 5 is so notified by the memory controller 3. Upon receipt of the notification, the system controller 5 issues two commands: one is a command to the memory controller 3 to stop the data transfer from the buffer memory 2 to the disk device 4, and the other is a command to the disk device 4 to stop writing data onto the disk. In normal operation, the cycle of writing data onto the disk device 4 when the available capacity of the buffer memory 2 drops below TH1, and not writing data onto the disk when the available capacity of the buffer memory 2 exceeds TH2 is repeated hereinafter. In normal operation, the compressing circuit 1 compresses both the image data and audio data and the appended data generating circuit 11 does not operate.

Assume that an impact is applied to the disk device 4 at a time T3, and the disk device 4 becomes unable to write data and takes a time T7 to be restored to the data writable state. Then, the available capacity of the buffer memory 2 starts to decrease over time and drops below the first predetermined value TH1 at a time T4, at which the disk device 4 has not yet been restored to the data writable state. Thus, the system controller 5 does not start the data transfer from the buffer memory 2 to the disk device 4, and the available capacity of the buffer memory 2 keeps decreasing.

In the meantime, the available capacity of the buffer memory 2 drops below a third predetermined value TH3 at a time T5 and the system controller 5 is so notified by the memory controller 3. Upon receipt of the notification, the system controller 5 issues a command to the compressing circuit 1 to suspend the image data compression. Upon receipt of the command, the compressing circuit 1 suspends the image data compression, and continues the audio data compression alone. The amount of the compressed image data is approximately 4 Mbps as previously mentioned, and the amount of the audio data is 0.3 Mbps. Thus, suspending the image data compression can decrease the amount of data transferred to the buffer memory 2 to ¹⁄₁₀ or less. Generally, the image data is compressed per data block, each data block having a certain amount of data, and the compression process cannot be suspended while a data block is being processed. Therefore, the compressing circuit 1 suspends the image data compression at a time T6 at which the compressing circuit 1 starts the processing of a new data block following a data block which was being processed when the command from the system controller 5 arrived.

In the meantime, the system controller 5 detects that the image data compression by the compressing circuit 1 has suspended at the time T6, and so indicates on the display device 6. To be more specific, since the camcorder has a liquid crystal monitor screen, a display indicating that the image data compression has been suspended is shown on the screen. Alternatively, an LED may be used as a display element and turned on when the image data compression has suspended. This display enables the user to take an appropriate action. For example, because it is known that the image data compression is suspended when considerable vibrations or an impact is applied to the camcorder, the user can support the camcorder more carefully to prevent the vibrations and impact thereon, so that the disk device 4 can be restored to the data writable state faster. Also, an instruction as above may be displayed on the liquid crystal monitor screen.

Further, the system controller 5 stores the time T6 at which the image data compression has suspended. Because the image data compression is suspended at the time T6, the data transfer rate from the compressing circuit 1 to the buffer memory 2 is reduced. Accordingly, the decreasing rate of the available amount of the buffer memory 2 starts to reduce from the time T6, and is indicated as a mild slope in Graph (a) of FIG. 6.

In the meantime, the system controller 5 detects that the disk device 4 has been restored to the data writable state at a time T7, and issues a command to the memory controller 3 to start the data transfer from the buffer memory 2 to the disk device 4, whereupon the available capacity of the buffer memory 2 starts to increase. At the same time, the system controller 5 issues a command to the compressing circuit 1 to resume the image data compression, and shows a display indicating that the image data compression is resumed, whereupon the compressing circuit 1 resumes the image data compression. The system controller 5 also stores the time T7 at which the image data compression is resumed.

Because the image data is not compressed for a period from T6 to T7, the buffer memory 2 stores only the audio data during this specific period. When the data compressed during this specific period is transferred from the buffer memory 2 to the disk device 4, the audio data alone may be transferred to the disk device 4. However, when the user reproduces the data later, he may not know why the audio data alone is reproduced. Therefore, when the audio data compressed during the above specific period is transferred to the disk device 4, the appended data generating circuit 11 generates predetermined images, which are transferred to the disk device 4 to pair with the compressed audio data. More specifically, because the system controller 5 stores the times T6 and T7, the system controller 5 issues two commands when the audio data compressed during this specific period are transferred to the disk device 4 from the buffer memory 2: one is a command to the appended data generating circuit 11 to generate appended image data, and the other is a command to the memory controller 3 to transfer the image data generated by the appended data generating circuit 11 to the disk device 4. Preferred appended data are the data indicating that the image data compression has been suspended, but may be a simple landscape. Alternatively, an image right before the suspension of the image data compression may be generated as a still image. Hereinafter, the normal operation is carried out repetitively.

Suspending the image data compression during the period of T6 and T7 shown in Graph (a) of FIG. 6 can reduce the decreasing rate of the available capacity of the buffer memory 2. Given that the buffer memory 2 has a capacity as large as its conventional counterpart, this specific period in Graph (a) of FIG. 6 reveals that it takes longer for the buffer memory 2 to store the data to its full capacity (available capacity=0), thereby providing a time margin until the disk device 4 is restored to the data writable state. Alternatively, if the buffer memory 2 and its conventional counterpart take the same time to store the data to their full capacity (available capacity=0), the amount of adopted memory can be reduced.

For further understanding, a more detailed explanation will now be given. For example, assume that a 16 Mb memory is used as the buffer memory 2, and the data is transferred to the same at a transfer rate of 4.3 Mbps for the first 3.5 seconds, after which the data transfer rate is reduced to 0.3 Mbps by suspending the image data compression. Then, a time necessary for the buffer memory 2 to store the data to its full capacity (available capacity=0) is computed as:

$$3.5\ s + (16\ Mb - 4.3\ Mbps \times 3.5\ s)/0.3\ Mbps = 6.2s.$$

Because it takes 6.2 seconds for the buffer memory 2 to store the data to its full capacity (available capacity=0), a maximum time margin of 6.2 seconds is provided until the disk device 4 is restored to the data writable state. Suppose if the apparatus always compresses both the image data and audio data like the conventional counterpart, then a transfer rate is fixed to 4.3 Mbps, and the time margin is as short as 16 Mb/4.3 Mbps=3.7 s. Thus, the apparatus of Embodiment 2 of the present invention can extend the time margin by a factor of 1.7. Conversely, the capacity of the buffer memory necessary to provide a time margin of 6.2 seconds in the conventional apparatus is computed as:

$$4.3\ Mbps \times 6.2\ s = 27\ Mb.$$

In contrast, the apparatus of Embodiment 2 can provide the same time margin with the buffer memory 2 of 16 Mb, thereby reducing the required amount of memory by approximately 40%. As explained above, the apparatus of Embodiment 2 of the present invention can reduce the capacity of buffer memory significantly, or increase the time margin for returning to the data writable state.

In Embodiment 2, two kinds of data, image data and audio data, are compressed, but more than two kinds of data may be compressed. Although the determination of which kind of data should be suspended requires more complicated control, the data transfer rate can be significantly reduced.

In Embodiment 2, the image data compression is suspended when the available capacity of the buffer memory 2 drops below TH3. However, the image data compression may be suspended at the time T3 at which the disk device 4 becomes unable to record the data, and resumed at the time T7 at which the disk device 4 has been restored to the data writable state. For this case, the image data compression is suspended earlier and the period without compressed image data is extended. However, this case has the advantage that the capacity of the buffer memory can be further reduced.

In addition, in Embodiment 2, the image data compression is resumed when the disk device 4 has been restored to the data writable state, but like in Embodiment 1, the image data compression may start when the available capacity of the buffer memory 2 exceeds the predetermined value. In this way, the image data compression can be resumed when the buffer memory 2 has gained a sufficient available capacity. Therefore, if the disk device becomes unable to record the data due to a series of impacts, a time margin can be provided until the buffer memory stores the data to its full capacity (available capacity=o).

As explained above, a first compressed data storage apparatus of the present invention is characterized by comprising:

a compressing circuit for generating compressed data by compressing data;

a temporary storage circuit for temporarily storing the compressed data;

a storage device for storing the compressed data by retrieving the compressed data from the temporary storage circuit at a rate faster than a rate at which the compressing circuit outputs the compressed data to the temporary storage circuit; and, a control circuit for increasing a data compression ratio of the compressing circuit when detecting that the storage device has become unable to store the compressed data.

Also, a second compressed data storage apparatus of the present invention is characterized by comprising:

a compressing circuit for generating compressed data by compressing data;

a temporary storage circuit for temporarily storing the compressed data;

a storage device for storing the compressed data by retrieving the compressed data from the temporary storage circuit at a rate faster than a rate at which the compressing circuit outputs the compressed data to the temporary storage circuit;

an available capacity detecting circuit for detecting an unused memory capacity of the temporary storage circuit; and a control circuit for increasing a data compression ratio of the compressing circuit when the unused memory capacity detected by the available capacity detecting circuit is smaller than a predetermined value and the control circuit detects that the storage device has become unable to store the compressed data.

Further, a third compressed data storage apparatus of the present invention is characterized by comprising:

a compressing circuit for generating compressed data by compressing more than one kind of data;

a temporary storage circuit for temporarily storing the compressed data;

a storage device for storing the compressed data by retrieving the compressed data from the temporary storage circuit at a rate faster than a rate at which the compressing circuit outputs the compressed data to the temporary storage circuit; and a control circuit for compressing only a designated kind of data among more than one kind of data when detecting that the storage device has become unable to store the compressed data.

Furthermore, a fourth compressed data storage apparatus of the present invention is characterized by comprising:

a compressing circuit for generating compressed data by compressing more than one kind of data;

a temporary storage circuit for temporarily storing the compressed data;

a storage device for storing the compressed data by retrieving the compressed data from the temporary storage circuit at a rate faster than a rate at which the compressing circuit outputs the compressed data to the temporary storage circuit;

an available capacity detecting circuit for detecting an unused memory capacity of the temporary storage circuit; and a control circuit for compressing only a designated kind of data among more than one kind of data when the unused memory capacity detected by the available capacity detecting circuit is smaller than a predetermined value and the control circuit detects that the storage device has become unable to store the compressed data.

The first through fourth compressed data storage apparatuses can reduce the output rate of the compressing circuit at which the compressing circuit outputs the compressed data to the temporary storage circuit by, for example, increasing the compression ratio of the data amount, or compressing a part of more than one kind of data when the storage device has become unable to store the compressed data. Consequently, the memory capacity of the temporary storage circuit can be reduced, thereby realizing an inexpensive compressed data storage apparatus with excellent resistance to vibrations. Particularly, since the pick-up of the optical disk device is heavy and it takes a longer time to be restored to the data writable state, a more significant effect can be attained.

If the output rate of the compressed data is reduced when the control circuit detects that the storage device has become unable to store the compressed data like the first or third compressed data storage apparatus, the output rate can be reduced at an earlier timing compared with the second or fourth compressed data storage apparatus. Consequently, a time required for the temporary storage circuit to store the compressed data to its full capacity can be extended, thereby further reducing the memory capacity of the temporary storage circuit.

On the other hand, if the output rate of the compressing circuit is reduced when the unused memory capacity is smaller than the predetermined value and the control circuit detects that the storage device has become unable to store the compressed data like the second or fourth compressed data storage apparatus, the output rate can be reduced at a later timing compared with the first or third compressed data storage apparatus while securing a time until the temporary storage circuit has stored the compressed data to its full capacity. Consequently, it has become possible to shorten a period in which the quality of the compressed data stored in the storage circuit deteriorates.

A fifth compressed data storage apparatus of the present invention is the first or second compressed data storage apparatus further characterized by additionally comprising a display circuit for displaying a change of the compression ratio.

Further, a sixth compressed data storage apparatus of the present invention is the third or fourth compressed data storage apparatus further characterized by additionally comprising a display circuit for displaying a kind (kinds) of data which are not compressed among more than one kind of data.

The fifth and sixth compressed data storage apparatuses respectively display the compression ratio and the kinds of the data when the compression ratio is increased and the number (kind(s)) of the data to be compressed is limited, respectively. Consequently, the user can take an appropriate action in each case.

Also, a seventh compressed data storage apparatus of the present invention is the first or second compressed data storage apparatus further characterized in that the control circuit increases the data compression ratio of the compressing circuit to the normal value when detecting that the storage device has been restored to the data writable state.

Further, an eighth compressed data storage apparatus of the present invention is the second compressed data storage circuit further characterized in that the control circuit increases the data compression ratio to the normal value when the unused memory capacity detected by the available capacity detecting circuit is larger than a predetermined value and the control circuit detects that the storage device has been restored to the data writable state.

In addition, a ninth compressed data storage apparatus of the present invention is the third or fourth compressed data storage apparatus further characterized in that the control circuit starts to compress all kinds of data again by means of the compressing circuit when detecting that the storage device has been restored to the data writable state.

Furthermore, a tenth compressed data storage apparatus of the present invention is the fourth compressed data storage apparatus further characterized in that the control circuit starts to compress all kinds of data again by means of the compressing circuit when the unused memory capacity detected by the available capacity detecting circuit is larger than a predetermined value and the control circuit detects that the storage device has been restored to the data writable state.

The seventh through tenth compressed data storage apparatuses increased the output rate of the compressed data to the normal value when the storage device is restored to the data writable state by increasing the compression ratio to the normal value or by compressing all kinds of data again. Consequently, it has become possible to shorten a period during which unwanted data are stored, for example, a period during which the quality of the compressed data stored in the storage device deteriorates, or less kinds of compressed data are stored in the storage device.

In particular, if the output rate is increased to the normal value when the control circuit detects that the storage device has been restored to the data writable state like the seventh or ninth compressed data storage apparatus, the output rate can be increased to the normal value at an early timing compared with the eighth or tenth compressed data storage apparatus. Consequently, the period during which the unwanted data are stored can be shortened.

On the other hand, if the output rate of the compressed data is increased to the normal value when the unused memory capacity detected by the available capacity is larger than the predetermined value and the control circuit detects that the storage device has been restored to the data writable state like the eighth or tenth compressed data storage apparatus, a time can be secured until the temporary storage circuit has stored the compressed data to its full capacity even if the storage device has become unable to store the compressed data continuously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compressed data storage apparatus for storing data after compressing the data, comprising:

compressing means for generating compressed data by compressing the data;

temporary storage means for temporarily storing the compressed data;

storage means for storing the compressed data by retrieving the compressed data from said temporary storage means at a rate faster than an output rate at which said compressing means outputs the compressed data to said temporary storage means; and control means for, when detecting that said storage means has become unable to store the compressed data, reducing the output rate of said compressing means to be smaller than an initial output rate at which the compressed data had been outputted until said storage means has become unable to store the compressed data, and to be larger than 0.

2. The compressed data storage apparatus of claim 1, wherein:

said compressing means can change a compression ratio at which the data are compressed; and said control means increases the compression ratio of said compressing means to be larger than an initial compression ratio, at which the data had been compressed until said storage means has become unable to store the compressed data, when reducing the output rate of said compressing means.

3. The compressed data storage apparatus of claim 2, wherein said control means increases the compression ratio of said compressing means gradually.

4. The compressed data storage apparatus of claim 2, wherein said control means monitors whether said storage means is in a data writable state or not, and increases the compression ratio of said compressing means whenever detecting that said storage means has become unable to store the compressed data.

5. The compressed data storage apparatus of claim 2 further comprising:

available capacity detecting means for detecting an unused memory capacity of said temporary storage means, wherein, said control means increases the compression ratio of said compressing means when said control means detects that said storage means has become unable to store the compressed data and the unused memory capacity detected by said available capacity detecting means is smaller than a first predetermined value.

6. The compressed data storage apparatus of claim 5, wherein said control means reduces the compression ratio of said compressing means to the initial compression ratio when said control means detects that said storage means has been restored to the data writable state and the unused memory capacity detected by said available capacity detecting means is larger than a second predetermined value, said second predetermined value being equal to or larger than said first predetermined value.

7. The compressed data storage apparatus of claim 2, wherein said control means reduces the compression ratio of said compressing means to the initial compression ratio when detecting that said storage means has been restored to a data writable state.

8. The compressed data storage apparatus of claim 7, wherein said control means monitors whether or not said storage means is in the data writable state, and reduces the compression ratio of said compressing means to the initial compression ratio whenever detecting that said storage means has been restored to the data writable state.

9. The compressed data storage apparatus of claim 7 further comprising:

available capacity detecting means for detecting an unused memory capacity of said temporary storage means, wherein, said control means reduces the compression ratio of said compressing means to the initial compression ratio when said control means detects that said storage means has been restored to the data writable state and the unused memory capacity detected by said available capacity detecting means is larger than a predetermined value.

10. The compressed data storage apparatus of claim 2 further comprising:

display means for showing a display indicating a change of the compression ratio of said compressing means.

11. The compressed data storage apparatus of claim 1, wherein when said compressing means receives more than one kind of data, and said control means reduces the output rate of said compressing means, said control means limits a kind of data to be compressed by said compressing means to a first group of data among all kinds of data received by said compressing means.

12. The compressed data storage apparatus of claim 11, wherein said control means monitors whether or not said storage means is in a data writable state, and limits the kind of data to be compressed by said compressing means to said first group of data whenever detecting that said storage means has become unable to store the compressed data.

13. The compressed data storage apparatus of claim 11 further comprising:

available capacity detecting means for detecting an unused memory capacity of said temporary storage means, wherein, said control means limits the kind of data to be compressed by said compressing means to said first group of data when said control means detects that said storage means has become unable to store the compressed data and the unused memory capacity detected by said available capacity detecting means is smaller than a first predetermined value.

14. The compressed data storage apparatus of claim 11 further comprising:

display means for displaying other kinds of data which are not being compressed by said compressing means.

15. The compressed data storage apparatus of claim 11 further comprising:

appended data generating means for appending data related to a second group of data to the compressed data generated out of said first group of data when said compressed data are stored, said second group of data comprising all kinds of data other than said first group of data.

16. The compressed data storage apparatus of claim 15, wherein said appended data generating means appends predetermined data to the compressed data.

17. The compressed data storage apparatus of claim 15, wherein said appended data generating means withholds said second group of data immediately before the kind of data to be compressed are limited to said first kind of data, and appends said withheld data to the compressed data.

18. The compressed data storage apparatus of claim 11, wherein said control means lifts the limitation on compressing said first group of data, so that said compressing means compresses all kinds of data when detecting that said storage means has been restored to a data writable state.

19. The compressed data storage apparatus of claim 18, wherein said control means monitors whether or not said storage means is in the data writable state, and lifts the limitation on compressing said first group of data, so that said compressing means compresses all kinds of data whenever detecting that said storage means has been restored to the data writable state.

20. The compressed data storage apparatus of claim 18 further comprising:

available capacity detecting means for detecting an unused memory capacity of said temporary storage means, wherein, said control means lifts the limitation on compressing said first group of data, so that said compressing means compresses all kinds of data when said control means detects that said storage means has been restored to the data writable state and the unused memory capacity detected by said available capacity detecting means is larger than a predetermined value.

21. The compressed data storage apparatus of claim 20, said control means lifts the limitation on compressing said first group of data, so that said compressing means compresses all kinds of data when said control means detects that said storage means has been restored to the data writable state and the unused memory capacity detected by said available capacity detecting means is larger than a second predetermined value, said second predetermined value being equal to or larger than said first predetermined value.

22. The compressed data storage apparatus of claim 1, wherein said control means monitors whether said storage means is in a data writable state or not, and reduces the output rate of said compressing means whenever detecting that said storage means has become unable to store the compressed data.

23. The compressed data storage apparatus of claim 1 further comprising:

available capacity detecting means for detecting an unused memory capacity of said temporary storage means, wherein, said control means reduces the output rate of said compressing means when said control means detects that said storage means has become unable to store the compressed data and the unused memory capacity detected by said available capacity detecting means is smaller than a first predetermined value.

24. The compressed data storage apparatus of claim 23, wherein said control means increases the output rate of said compressing means to the initial output rate when said control means detects that said storage means has been restored to the data writable state and the unused memory capacity detected by said available capacity detecting means is larger than a second predetermined value, said second predetermined value being equal to or larger than said first predetermined value.

25. The compressed data storage apparatus of claim 1 further comprising:

notifying means for notifying that the output rate of said compressing means is being reduced by said control means.

26. The compressed data storage apparatus of claim 25, said control means increases the output rate of said compressing means to the initial output rate when detecting that said storage means has been restored to a data writable state.

27. The compressed data storage apparatus of claim 26, said control means monitors whether or not said storage means is in a data writable state, and increases the output rate of said compressing means to the initial output rate whenever detecting that said storage means has been restored to a data writable state.

28. The compressed data storage apparatus of claim 26 further comprising:

available capacity detecting means for detecting an unused memory capacity of said temporary storage means, wherein, said control means increases the output rate of said compressing means to the initial output rate when said control means detects that said storage means has been restored to the data writable state and the unused memory capacity detected by said available capacity detecting means is larger than a predetermined value.

29. The compressed data storage apparatus of claim 1, wherein said storage means is an optical disk device.

\* \* \* \* \*